(12) United States Patent
Nagamitsu

(10) Patent No.: US 12,277,413 B2
(45) Date of Patent: Apr. 15, 2025

(54) CENTER, UPDATE CONTROL METHOD, NON-TRANSITORY STORAGE MEDIUM, OTA MASTER, AND SOFTWARE UPDATE SYSTEM

(71) Applicant: TOYOTA JIDOSHA KABUSHIKI KAISHA, Toyota (JP)

(72) Inventor: Shoichi Nagamitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 17/572,798

(22) Filed: Jan. 11, 2022

(65) Prior Publication Data

US 2022/0283797 A1     Sep. 8, 2022

(30) Foreign Application Priority Data

Mar. 5, 2021   (JP) .................... 2021-035142

(51) Int. Cl.
*G06F 8/65* (2018.01)
*G07C 5/00* (2006.01)
(Continued)

(52) U.S. Cl.
CPC .............. *G06F 8/65* (2013.01); *G07C 5/008* (2013.01); *G07C 5/0808* (2013.01);
(Continued)

(58) Field of Classification Search
CPC .......... G06F 8/65; G06F 8/654; G06F 21/572; G07C 5/008; G07C 5/0808; G07C 5/0816;
(Continued)

(56) References Cited

U.S. PATENT DOCUMENTS

2014/0282470 A1*  9/2014  Buga .................... G06F 8/65
                                                        717/170
2016/0294605 A1*  10/2016  Searle ................ H04L 41/069
(Continued)

FOREIGN PATENT DOCUMENTS

JP    2020-004245 A    1/2020
JP    2020-027620 A    2/2020
WO    2020/162430 A1   8/2020

OTHER PUBLICATIONS

Aljanabi et al, DE 102019134131, (translation) Jul. 23, 2020, 11 pgs <DE_102019134131.pdf>.*
Li et al, CN 105404273, (translation), Dec. 25, 2018, 14 pgs <CN_105404273.jpg>.*
Kato et al, JP 2012101788 (translation), May 31, 2012, 15 pgs <JP_2012101788.jpg>.*

*Primary Examiner* — Tuan A Vu
(74) *Attorney, Agent, or Firm* — Oliff PLC

(57) ABSTRACT

A center configured to communicate with an OTA master and a malfunction management server includes a processor. The malfunction management server is configured to store malfunction occurrence information. The processor is configured to receive the malfunction occurrence information from the malfunction management server and an inquiry about presence or absence of an update of software of an electronic control device from the OTA master. The processor is configured to determine, when the inquiry is received, whether the vehicle that has transmitted the inquiry malfunctions based on the malfunction occurrence information. The processor is configured to restrict, when it is determined that the vehicle that has transmitted the inquiry malfunctions, execution of an update process for the software on the vehicle that has transmitted the inquiry.

6 Claims, 10 Drawing Sheets

(51) Int. Cl.
*G07C 5/08* (2006.01)
*B60Q 11/00* (2006.01)
*B60R 16/023* (2006.01)
*B60W 50/029* (2012.01)
*H04L 41/069* (2022.01)

(52) U.S. Cl.
CPC ............ *G07C 5/0816* (2013.01); *B60Q 11/00* (2013.01); *B60R 16/0231* (2013.01); *B60W 50/029* (2013.01); *H04L 41/069* (2013.01)

(58) Field of Classification Search
CPC . B60R 16/0231; B60R 16/0221; B60Q 11/00; B60W 50/029; H04L 41/069
See application file for complete search history.

(56) References Cited

U.S. PATENT DOCUMENTS

| | | | |
|---|---|---|---|
| 2019/0300008 A1* | 10/2019 | Ando | B60W 50/029 |
| 2019/0391800 A1* | 12/2019 | Lin | G06F 8/65 |
| 2020/0104113 A1* | 4/2020 | Grill | G06F 8/65 |
| 2020/0398751 A1* | 12/2020 | Pampattiwar | B60Q 11/00 |
| 2021/0141631 A1* | 5/2021 | Harata | G06F 21/572 |
| 2021/0157492 A1* | 5/2021 | Harata | B60R 16/0231 |
| 2021/0157529 A1 | 5/2021 | Sakurai et al. | |
| 2021/0157571 A1* | 5/2021 | Ogawa | G06F 8/654 |
| 2022/0197747 A1 | 6/2022 | Fuju et al. | |

* cited by examiner

| VEHICLE IDENTIFICATION NUMBER | MALFUNCTION STATUS | MALFUNCTION LOG |
|---|---|---|
| 0001 | NORMAL | ... |
| 0002 | MALFUNCTIONING | ... |
| 0003 | NORMAL | ... |
| 0003 | MALFUNCTIONING | ... |

| VEHICLE IDENTIFICATION NUMBER | MALFUNCTION STATUS | MALFUNCTION LOG |
|---|---|---|
| 0001 | NORMAL | · · · |
| 0002 | MALFUNCTIONING | · · · |
| 0003 | NORMAL | · · · |
| 0003 | MALFUNCTIONING | · · · |

CENTER, UPDATE CONTROL METHOD, NON-TRANSITORY STORAGE MEDIUM, OTA MASTER, AND SOFTWARE UPDATE SYSTEM

CROSS-REFERENCE TO RELATED APPLICATION

This application claims priority to Japanese Patent Application No. 2021-035142 filed on Mar. 5, 2021, incorporated herein by reference in its entirety.

BACKGROUND

1. Technical Field

The present disclosure relates to a center, an update control method, a non-transitory storage medium, an over-the-air (OTA) master, and a software update system to be used for an OTA service.

2. Description of Related Art

Vehicles include a plurality of electronic control devices (referred to as "ECUs") configured to execute control functions. The electronic control device includes a processor and a storage unit. The control functions of the electronic control device are implemented by the processor executing software stored in the storage unit. The software stored in each electronic control device can be updated. Specifically, the software can be updated in a maintenance shop or the like by using external equipment connected via a diagnostic connector provided in the vehicle. Communication equipment provided in an in-vehicle network and a communication network such as the Internet may be connected wirelessly to update the software with software downloaded from a distribution server in an update center through wireless communication (for example, Japanese Unexamined Patent Application Publication No. 2020-004245 (JP 2020-004245 A)). This update service through wireless communication is referred to as "OTA service".

SUMMARY

In the OTA service, there is a possibility that software is updated even though the vehicle malfunctions (malfunctioning state). When software is updated for the vehicle with a malfunction, there is a possibility that the software cannot be updated appropriately. It is desirable not to update the software when the vehicle malfunctions. When establishing connection between the vehicle and the center to execute software update by the OTA service, the connection is always started from the vehicle, that is, the vehicle is designed to trigger the connection. Unless the vehicle takes action, the connection to the vehicle cannot be established, and the center cannot grasp the malfunctioning state of the vehicle.

In view of the above, after the connection is established, the center may inquire malfunction information from the vehicle each time for software update. In this case, however, the amount of communication between the center and the vehicle increases due to the inquiry for malfunction information. Therefore, communication costs increase.

When the vehicle malfunctions, the vehicle generally transmits its malfunction information to a malfunction management server. The malfunction management server is provided in a malfunction management system for grasping and managing malfunctioning states of vehicles (substantially in real time). If the center inquires malfunction information from the vehicle each time for software update, the vehicle transmits again, to the center, malfunction information that has already been reported to the malfunction management server. Such two-time transmission is a load on the vehicle. Therefore, excess communication costs may be required from this viewpoint as well.

The present disclosure provides a center, an update control method, a non-transitory storage medium, an OTA master, and a software update system in which software update can be controlled depending on a malfunction status of a vehicle without inquiring malfunction information from the vehicle.

A first aspect of a technology of the present disclosure relates to a center configured to communicate with an OTA master and a malfunction management server via a network. The OTA master is mounted on a vehicle. The malfunction management server is configured to store malfunction occurrence information. The malfunction occurrence information is information in which a malfunction information code transmitted from the vehicle with a malfunction corresponds to information for identifying the vehicle with the malfunction. The center includes a processor. The processor is configured to receive the malfunction occurrence information transmitted by the malfunction management server. The processor is configured to store the malfunction occurrence information received from the malfunction management server. The processor is configured to receive, from the OTA master, an inquiry about presence or absence of an update of software of an electronic control device. The processor is configured to determine, when the processor receives the inquiry, whether the vehicle that has transmitted the inquiry malfunctions based on the malfunction occurrence information. The processor is configured to restrict, when the processor determines that the vehicle that has transmitted the inquiry malfunctions, execution of an update process for the software on the vehicle that has transmitted the inquiry.

In the center according to the first aspect of the technology of the present disclosure, the processor may be configured to transmit, when the processor determines that the vehicle that has transmitted the inquiry malfunctions, information indicating that the vehicle malfunctions to the vehicle that has transmitted the inquiry.

In the center according to the first aspect of the technology of the present disclosure, the malfunction management server may be configured to transmit the malfunction occurrence information to the center when the malfunction occurrence information is newly registered in the malfunction management server.

A second aspect of the technology of the present disclosure relates to an update control method to be executed by a computer of a center including a processor, a memory, and a communication device. The communication device is configured to communicate with an OTA master and a malfunction management server via a network. The OTA master is mounted on a vehicle. The malfunction management server is configured to store malfunction occurrence information. The malfunction occurrence information is information in which a malfunction information code transmitted from the vehicle with a malfunction corresponds to information for identifying the vehicle with the malfunction. The update control method includes receiving the malfunction occurrence information transmitted by the malfunction management server, storing the malfunction occurrence information received from the malfunction management server, receiving, from the OTA master, an inquiry about presence or absence of an update of software of an electronic control device, determining, when the inquiry is received, whether the vehicle that has transmitted the inquiry malfunctions based on the malfunction occurrence information, and restricting, when it is determined that the vehicle that has transmitted the inquiry malfunctions, execution of an update process for the software on the vehicle that has transmitted the inquiry.

A third aspect of the technology of the present disclosure relates to a non-transitory storage medium storing instructions that are executable by a computer of a center including a processor, a memory, and a communication device and that cause the computer to perform functions. The communication device is configured to communicate with an OTA master and a malfunction management server via a network. The OTA master is mounted on a vehicle. The malfunction management server is configured to store malfunction occurrence information. The malfunction occurrence information is information in which a malfunction information code transmitted from the vehicle with a malfunction corresponds to information for identifying the vehicle with the malfunction. The functions include receiving the malfunction occurrence information from the malfunction management server, storing the malfunction occurrence information received from the malfunction management server, receiving, from the OTA master, an inquiry about presence or absence of an update of software of an electronic control device, determining, when the inquiry is received, whether the vehicle that has transmitted the inquiry malfunctions based on the malfunction occurrence information, and restricting, when it is determined that the vehicle that has transmitted the inquiry malfunctions, execution of an update process for the software on the vehicle that has transmitted the inquiry.

A fourth aspect of the technology of the present disclosure relates to an OTA master to be mounted on a vehicle. The OTA master includes a processor. The processor is configured to connect to an in-vehicle network including a plurality of electronic control devices. The processor is configured to communicate with a center via a network. The processor is configured to update software of at least one of the electronic control devices. The processor is configured to transmit, to the center, an inquiry about presence or absence of an update of the software of the at least one of the electronic control devices. The processor is configured to notify, when information indicating malfunction occurring in the vehicle is received from the center in response to the inquiry, a user about predetermined information related to the malfunction.

A fifth aspect of the technology of the present disclosure relates to a software update system. The software update system includes a vehicle including an OTA master, a malfunction management server, and a center. The vehicle is configured to detect malfunction occurring in the vehicle. The vehicle is configured to transmit malfunction occurrence information to the malfunction management server. The malfunction occurrence information includes information for identifying the vehicle and a malfunction information code related to the malfunction. The malfunction management server is configured to communicate with the OTA master and the center via a network. The malfunction management server is configured to receive the malfunction occurrence information transmitted from the vehicle. The malfunction management server is configured to transmit the malfunction occurrence information to the center. The center is configured to communicate with the OTA master and the malfunction management server via the network. The center is configured to store the malfunction occurrence information transmitted from the malfunction management server. The center is configured to receive, from the OTA master, an inquiry about presence or absence of an update of software. The center is configured to determine, when the inquiry is received, whether the vehicle that has transmitted the inquiry malfunctions based on the stored malfunction occurrence information. The center is configured to restrict, when determination is made that the vehicle that has transmitted the inquiry malfunctions, execution of an update process for the software on the vehicle that has transmitted the inquiry.

With the center, the update control method, the non-transitory storage medium, the OTA master, and the software update system according to the present disclosure, the software update control can be executed depending on the malfunction status of the vehicle without inquiring the malfunction information from the vehicle for the software update.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment will be described below in detail with reference to the drawings.

Overall Configuration of System of Embodiment

Figure 1:
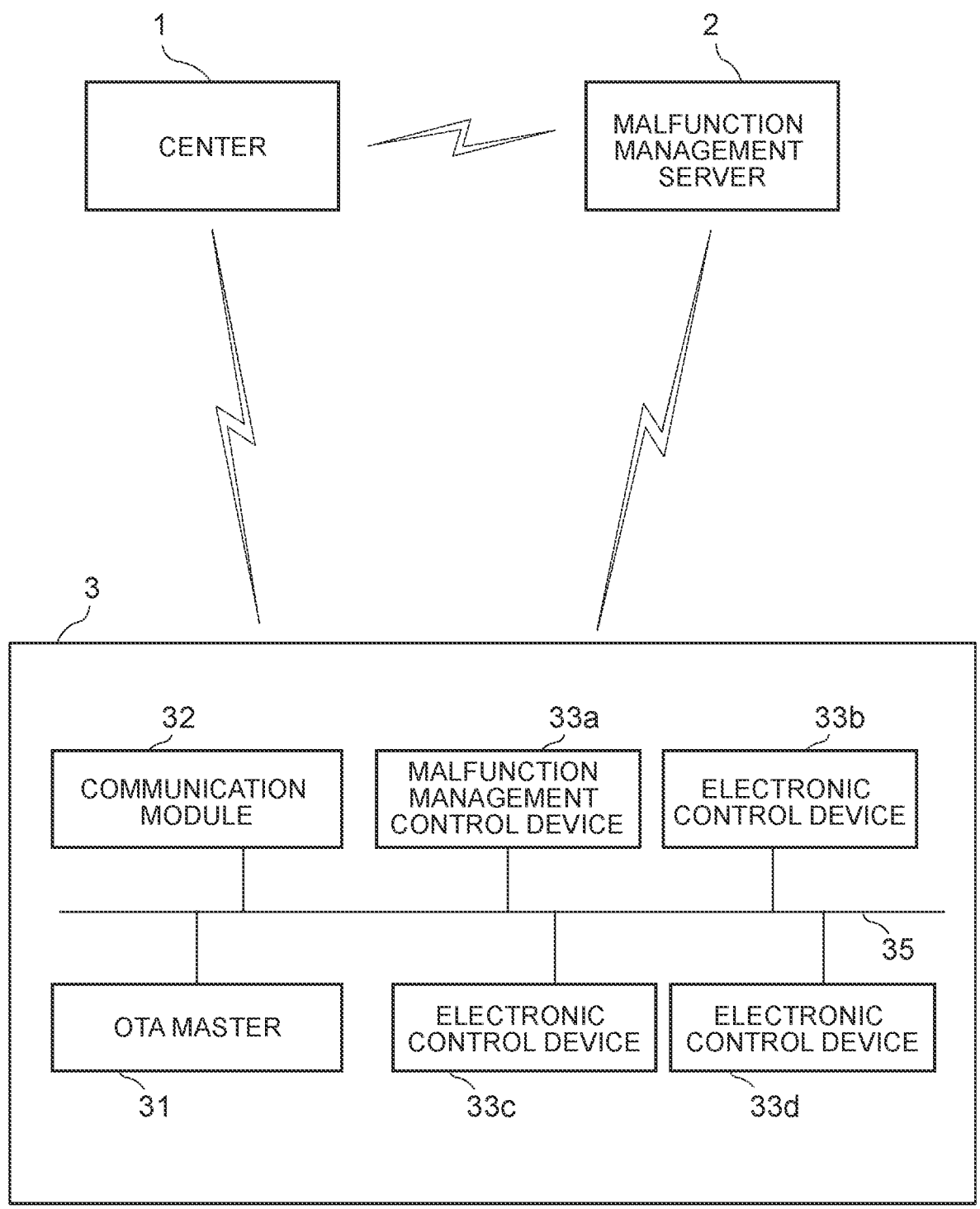
FIG. 1 is a block diagram illustrating an overall configuration of a system according to an embodiment.

FIG. 1 is a block diagram illustrating an overall configuration of an update management system according to the present embodiment. The update management system includes an OTA center (hereinafter referred to simply as "center") 1, a malfunction management server 2, and a vehicle 3.

The center 1 is a server configured to manage software update of in-vehicle devices provided in the vehicle 3 (to be exact, the center 1 is a center system including such a server, but is described as a server below for convenience of description). The center 1 can communicate with the malfunction management server 2 and the vehicle 3.

The malfunction management server 2 is a server to manage a malfunction occurrence status of the vehicle 3. Upon detection of occurrence of malfunction in the vehicle 3, malfunction occurrence information including a malfunction code indicating malfunction details is transmitted from the vehicle 3 to the malfunction management server 2. The malfunction management server 2 stores the malfunction occurrence information. When the vehicle 3 malfunctions, the malfunction management server 2 can grasp a situation in which the vehicle 3 malfunctions (substantially in real time). When the malfunction management server 2 receives the malfunction occurrence information from the vehicle 3, the malfunction management server 2 transmits the malfunction occurrence information to the center 1. The present embodiment is directed to an example in which the malfunction management server 2 sends the malfunction occurrence information received from the vehicle 3 to the center 1 without changing the malfunction occurrence information. In other embodiments, the malfunction management server 2 may transmit, to the center 1, processed data of the malfunction occurrence information received from the vehicle 3. When the malfunction management server 2 receives, from the vehicle 3, a malfunction resolution notification indicating that malfunction occurring in the vehicle 3 has been resolved, the malfunction management server 2 updates data related to the vehicle 3 and stored in the malfunction management server 2 based on the malfunction resolution notification so that the data indicates that no malfunction occurs. The malfunction management server 2 transmits the malfunction resolution notification to the center 1.

The vehicle 3 includes an in-vehicle network system. The in-vehicle network system can communicate with the center 1 and the malfunction management server 2. The in-vehicle network system includes at least an OTA master (software update device) 31, a communication module 32, and a plurality of electronic control devices 33a to 33d. Among these components, the electronic control device 33a has a function of transmitting malfunction information to the malfunction management server 2 when malfunction occurs in the vehicle 3. The electronic control device 33a is hereinafter referred to particularly as "malfunction management control device 33a".

The OTA master 31 is connected to the communication module 32, the malfunction management control device 33a, and the other electronic control devices 33b to 33d via a bus 35. The OTA master 31 can wirelessly communicate with the center 1 via the communication module 32. The OTA master 31 exchanges predetermined data with the center 1 and controls a software update process of each electronic control device 33. That is, the OTA master 31 has a software update function. The communication module 32 is a communication device connected to a predetermined network (telephone network, Internet, etc.).

The malfunction management control device 33a can wirelessly communicate with the malfunction management server 2 via the communication module 32. The malfunction management control device 33a detects the occurrence of malfunction in the vehicle 3, generates malfunction occurrence information related to the malfunction, and transmits the malfunction occurrence information to the malfunction management server 2. The malfunction can be detected based on, for example, whether a malfunction code is output to the malfunction management control device 33a from an in-vehicle diagnostic device (not illustrated). The malfunction occurrence information includes at least the malfunction code and a vehicle identification number for identifying the vehicle 3. When the malfunction occurring in the vehicle 3 is resolved, the malfunction management control device 33a detects the resolution and transmits, to the malfunction management server 2, a malfunction resolution notification indicating that the malfunction has been resolved. The malfunction resolution notification includes the vehicle identification number and data indicating that the malfunction has been resolved.

The other electronic control devices 33b to 33d control operations of the individual parts of the vehicle 3. The number of electronic control devices 33 in FIG. 1 is an example.

Configuration of Center 1

Figure 2:
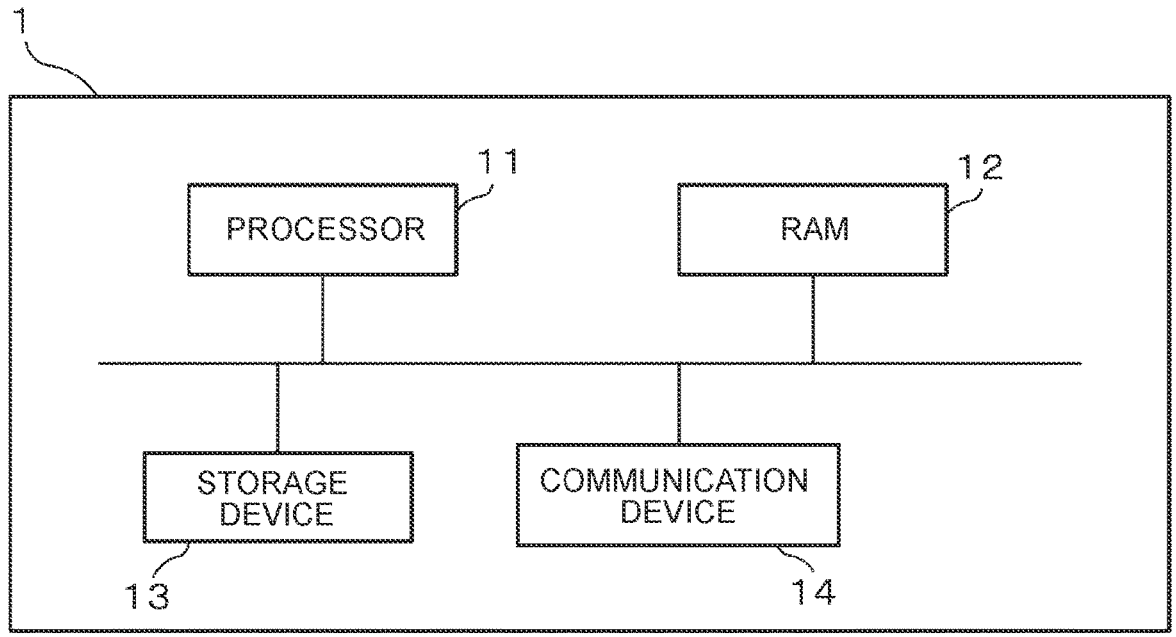
FIG. 2 is a block diagram illustrating a schematic configuration of a center 1.

FIG. 2 is a block diagram illustrating a schematic configuration of the center 1. As illustrated in FIG. 2, the center 1 includes a processor 11, a random-access memory (RAM) 12, a storage device 13, and a communication device 14. The storage device 13 includes a readable/writable storage medium such as a hard disk drive or a solid state drive (SSD), and stores various types of program and data necessary for processes according to the present embodiment. In the center 1, the processor 11 executes a predetermined control process by executing programs, read from the storage device 13, using the RAM 12 as a working area. The communication device 14 communicates with the malfunction management server 2 and the vehicle 3 via the network.

Configuration of Malfunction Management Server 2

Figure 3:
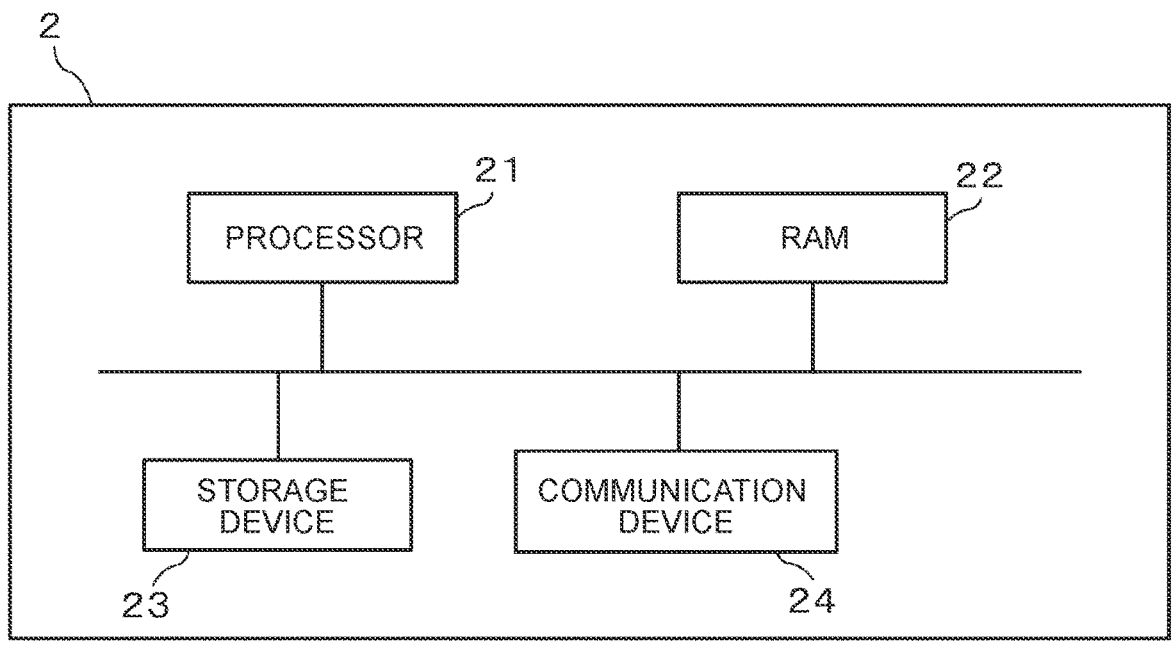
FIG. 3 is a block diagram illustrating a schematic configuration of a malfunction management server 2.

FIG. 3 is a block diagram illustrating a schematic configuration of the malfunction management server 2. As illustrated in FIG. 3, the malfunction management server 2 includes a processor 21, a RAM 22, a storage device 23, and a communication device 24. The storage device 23 includes a readable/writable storage medium such as a hard disk drive or an SSD. The storage device 23 stores various types of program and data necessary for processes according to the present embodiment. The processor 21 executes a predetermined control process by executing programs, read from the storage device 23, using the RAM 22 as a working area. The communication device 24 communicates with the center 1 and the vehicle 3 via the network.

Configuration of OTA Master 31

Figure 4:
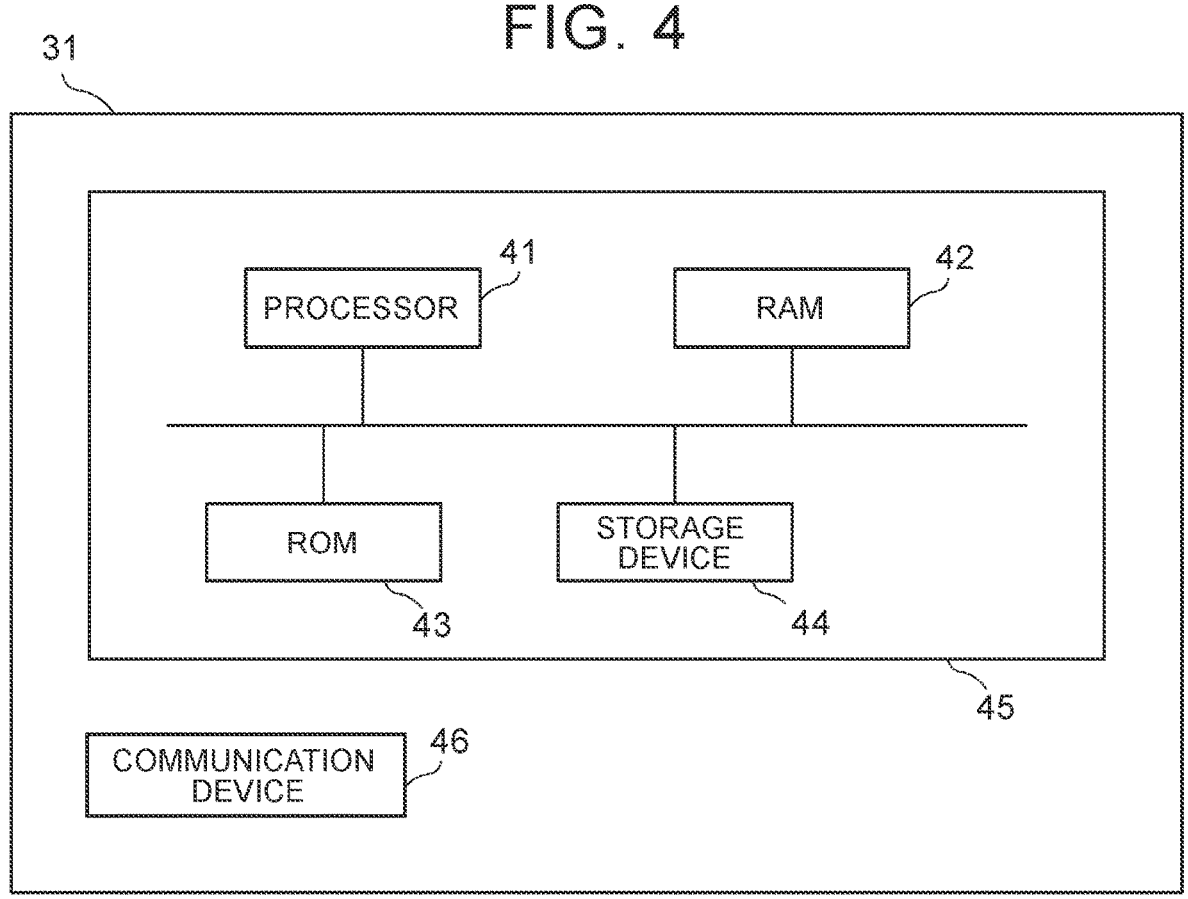
FIG. 4 is a block diagram illustrating a schematic configuration of an OTA master 31.

FIG. 4 is a block diagram illustrating a schematic configuration of the OTA master 31. As illustrated in FIG. 4, the OTA master 31 includes a microcomputer 45 and a communication device 46. The microcomputer 45 includes a processor 41, a RAM 42, a read-only memory (ROM) 43, and a storage device 44. In the OTA master 31, the processor 41 of the microcomputer 45 executes a predetermined control process by executing programs, read from the ROM 43, using the RAM 42 as a working area. The communication device 46 communicates with the communication module 32 and the electronic control devices 33a to 33d via the bus 35 illustrated in FIG. 1.

Functional Block Diagram of Center 1

Figure 5:
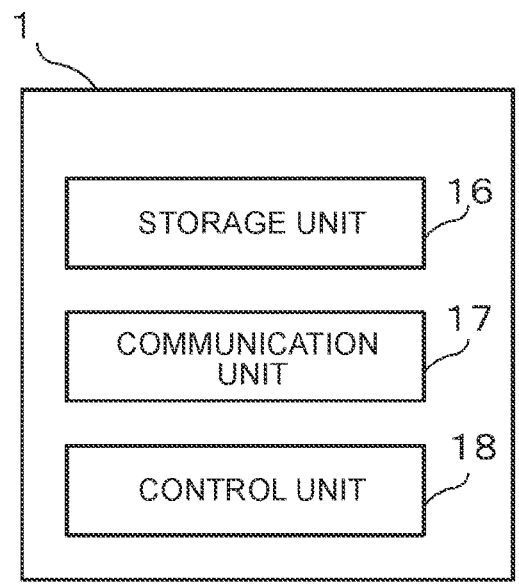
FIG. 5 is a functional block diagram of the center 1.

FIG. 5 is a functional block diagram of the center 1.

The center 1 includes a storage unit 16, a communication unit 17, and a control unit 18. The communication unit 17 and the control unit 18 are implemented by the processor 11 illustrated in FIG. 2 executing programs stored in the storage device 13 by using the RAM 12. The storage unit 16 is implemented by the storage device 13 illustrated in FIG. 2.

The storage unit 16 stores programs and data to be used in the processes according to the present embodiment.

The communication unit 17 can receive the malfunction occurrence information and the malfunction resolution notification from the malfunction management server 2. The communication unit 17 can receive, from the OTA master 31, data for inquiry about the presence or absence of software update (hereinafter referred to as "update inquiry"). The communication unit 17 can exchange, with the OTA master 31, predetermined data for execution of the software update process.

The control unit 18 stores data indicating a malfunction status of the vehicle 3 in the storage unit 16 based on the malfunction occurrence information received by the communication unit 17. When the control unit 18 receives the update inquiry from the OTA master 31, the control unit 18 determines whether the vehicle 3 malfunctions. When the vehicle 3 that has transmitted the update inquiry malfunctions, the control unit 18 executes control not to start the update process (restrict the start of the update process) even if there is a software update to be distributed. The control unit 18 does not start the software update process unless the update inquiry is received from the OTA master 31 (that is, the center 1 does not voluntarily start the software update process).

Functional Block Diagram of Malfunction Management Server 2

Figure 6:
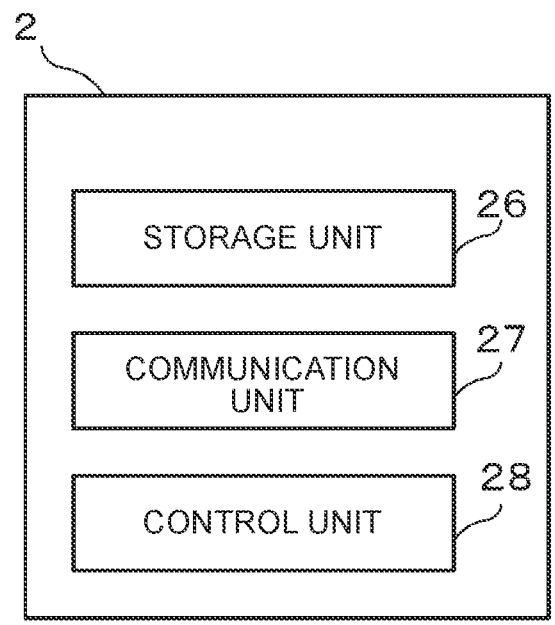
FIG. 6 is a functional block diagram of the malfunction management server 2.

FIG. 6 is a functional block diagram of the malfunction management server 2.

The malfunction management server 2 includes a storage unit 26, a communication unit 27, and a control unit 28. The communication unit 27 and the control unit 28 are implemented by the processor 21 illustrated in FIG. 3 executing programs, stored in the storage device 23, using the RAM 22. The storage unit 26 is implemented by the storage device 23 illustrated in FIG. 3.

The storage unit 26 stores programs and data to be used in the processes according to the present embodiment.

The communication unit 27 can receive the malfunction occurrence information from the vehicle 3 (malfunction management control device 33a) that has detected the occurrence of malfunction. The communication unit 27 can transmit, to the center 1, the malfunction occurrence information and the malfunction resolution notification related to the malfunctioning vehicle 3.

When the control unit 28 receives the malfunction occurrence information from the malfunction management control device 33a, the control unit 28 stores data indicating a malfunction status in the storage unit 26 based on the malfunction occurrence information. The control unit 28 transmits, to the center 1 via the communication unit 27, the malfunction occurrence information related to the malfunctioning vehicle 3. When the malfunction resolution notification is received, the control unit 28 updates the data indicating the malfunction status based on the malfunction resolution notification, and transmits the malfunction resolution notification to the center 1.

Functional Block Diagram of OTA Master 31

Figure 7:
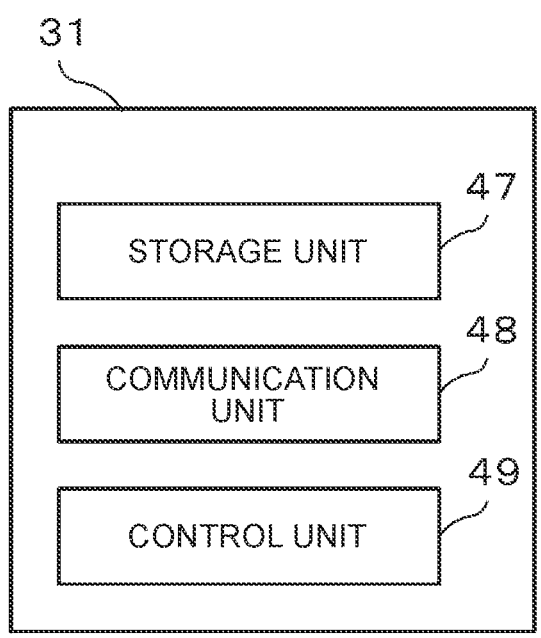
FIG. 7 is a functional block diagram of the OTA master 31.

FIG. 7 is a functional block diagram of the OTA master 31 illustrated in FIG. 4.

The OTA master 31 includes a storage unit 47, a communication unit 48, and a control unit 49. The storage unit 47 is implemented by the storage device 44 illustrated in FIG. 4. The communication unit 48 and the control unit 49 are implemented by the processor 41 illustrated in FIG. 4 executing programs, stored in the ROM 43, using the RAM 42.

The storage unit 47 stores various types of program and data for execution of the software update process.

When the occurrence of malfunction is detected, the communication unit 48 can transmit the malfunction occurrence information to the malfunction management server 2 based on a command from the malfunction management control device 33a. The communication unit 48 can exchange, with the center 1, various types of data necessary for the software update process, such as the update inquiry, based on a command from the control unit 49.

The control unit 49 executes various types of control related to the software update process. Specifically, the control unit 49 periodically transmits the update inquiry to the center 1 by using the communication unit 48. When software update data is distributed from the center 1 in a response to the update inquiry, the control unit 49 executes the software update process based on the distributed data. A timing of the update inquiry will be supplemented. In the present embodiment, it is assumed, for example, that the update inquiry is transmitted to the center 1 once every two weeks. The update inquiry is transmitted at such frequency from the viewpoint that the frequency of update check is desirably minimized in view of the fact that an increase in the frequency of update check causes an increase in the amount of communication between the vehicle 3 and the center 1 to increase communication costs.

Details of the processes according to the present embodiment will be described below.

Data for Use in Malfunction Management Server 2

Figures 8, 9:
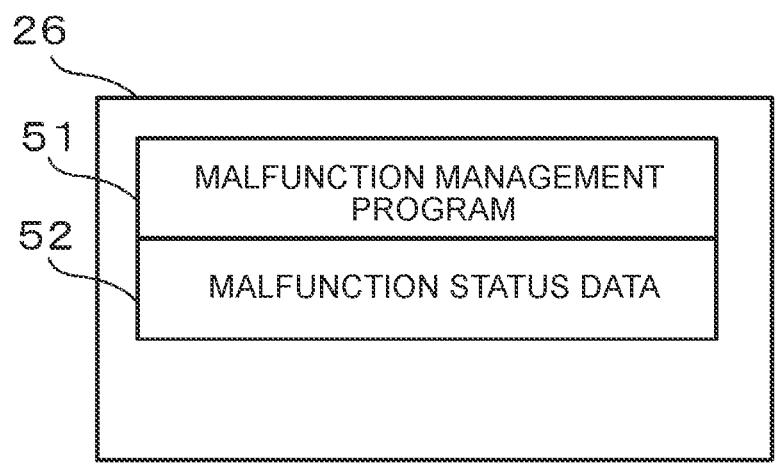
FIG. 8 illustrates a memory map showing an example of data stored in a storage unit 26 of the malfunction management server 2.
FIG. 9 illustrates an example of a data structure of malfunction status data 52.

First, data to be used in the processes according to the present embodiment will be described. FIG. 8 illustrates a memory map showing an example of data stored in the storage unit 26 of the malfunction management server 2. The storage unit 26 stores a malfunction management program 51 and malfunction status data 52.

The malfunction management program 51 is a program for executing, for example, processes of updating the malfunction status data 52 and transmitting the malfunction occurrence information to the center 1 based on the malfunction occurrence information transmitted from the vehicle 3.

The malfunction status data 52 indicates malfunction statuses of vehicles 3. FIG. 9 illustrates an example of a data structure of the malfunction status data 52. The malfunction status data 52 is tabular data including at least items of a vehicle identification number 53, a malfunction status 54, and a malfunction log 55. The vehicle identification number 53 is a number for uniquely identifying each vehicle. The malfunction status 54 is data indicating whether the vehicle 3 malfunctions. In the present embodiment, data indicating "malfunctioning" is set as the malfunction status 54 when the vehicle 3 malfunctions, and data indicating "normal" is set as the malfunction status 54 when the vehicle 3 does not malfunction. The malfunction log 55 is a log storing the malfunction code transmitted from the vehicle 3.

Data for Use in Center 1

Figures 10, 11:
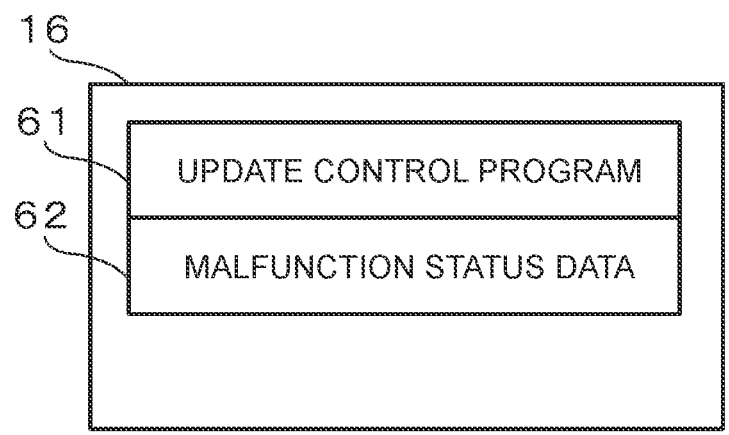
FIG. 10 illustrates a memory map showing an example of data stored in a storage unit 16 of the center 1.
FIG. 11 illustrates an example of a data structure of malfunction status data 62.

Next, data to be used in the processes of the center 1 will be described. FIG. 10 illustrates a memory map showing an example of data stored in the storage unit 16 of the center 1. The storage unit 16 stores an update control program 61 and malfunction status data 62. Although illustration is omitted, the storage unit 16 also stores various types of program and data for implementation of an OTA service.

The update control program 61 is a program for controlling the software update process.

The malfunction status data 62 is used for determining whether the vehicle 3 malfunctions. FIG. 11 illustrates an example of a data structure of the malfunction status data 62. The malfunction status data 62 is tabular data including items of a vehicle identification number 63, a malfunction status 64, and a malfunction log 65. The vehicle identification number 63 is a number for uniquely identifying each vehicle similarly to the malfunction status data 52 in the malfunction management server 2. The malfunction status 64 is data indicating whether the vehicle 3 malfunctions similar to that in the malfunction management server 2. The malfunction log 65 is a log of the malfunction code.

The present embodiment is directed to the exemplary configuration in which the malfunction log 65 is stored in the center 1. In other embodiments, the malfunction log 65 may not be stored in the center 1. In this case, it is appropriate that the malfunction management server 2 transmit, for example, only the vehicle identification number 53 as the malfunction occurrence information. In the case where the malfunction log 65 is stored in the center 1, more specific details of the vehicle malfunction can be grasped in the center 1. In the case where the malfunction log 65 is not stored in the center 1, the amount of communication between the malfunction management server 2 and the center 1 can be reduced.

Process to be Executed by Malfunction Management Server 2

Figure 12:
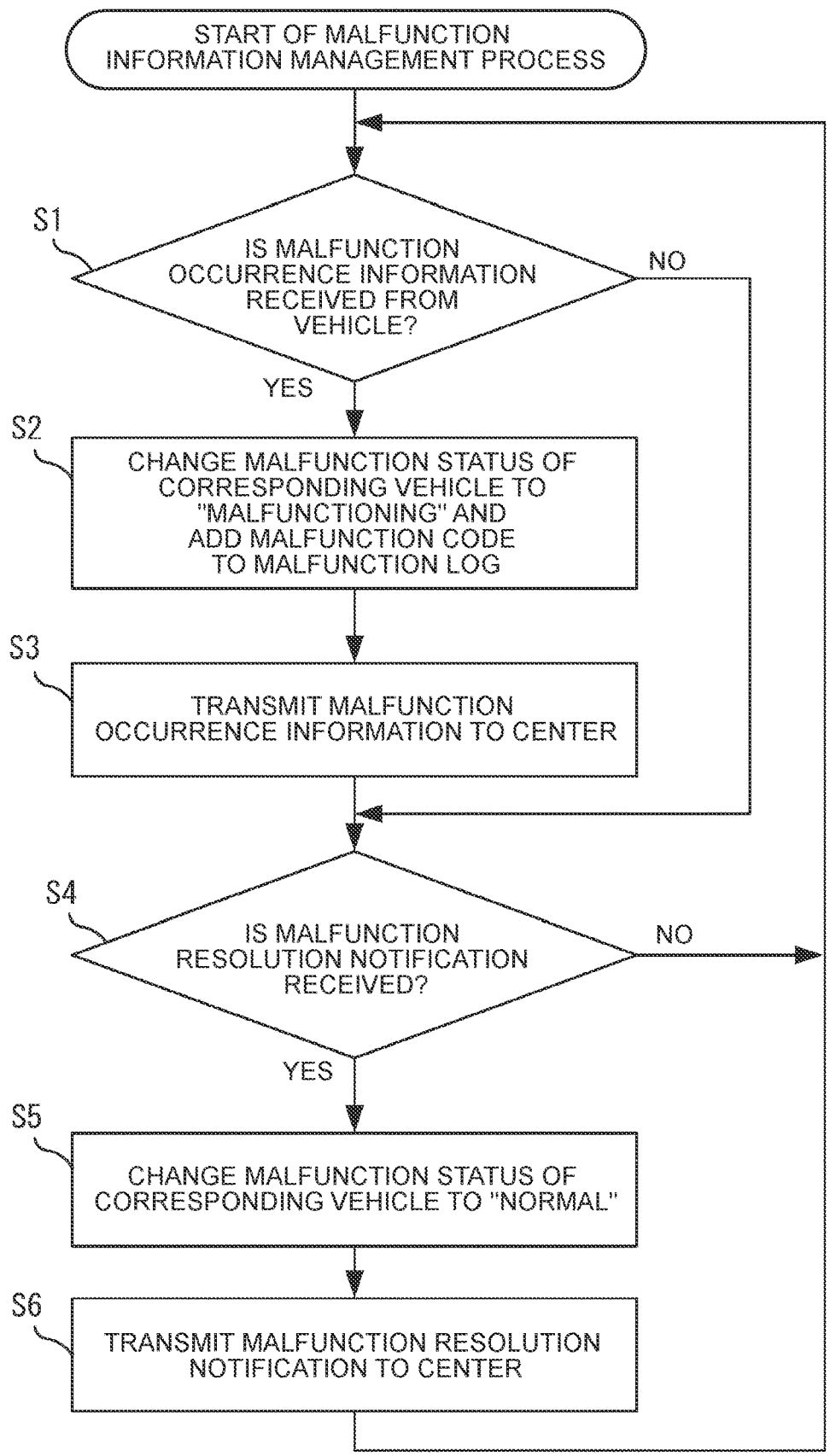
FIG. 12 is a flowchart illustrating details of a malfunction information management process.

Next, details of the process to be executed by the malfunction management server 2 will be described. FIG. 12 is a flowchart illustrating details of a malfunction information management process to be executed by the control unit 28 of the malfunction management server 2. This process is a process of registering malfunction occurrence information transmitted from the vehicle 3 in the malfunction status data 52 and updating its contents.

In Step S1, the control unit 28 first determines whether the malfunction occurrence information is received from a predetermined vehicle 3. When the malfunction occurrence information is not received as a result of the determination, the process proceeds to Step S4 described later.

When the malfunction occurrence information is received, the control unit 28 updates, in Step S2, the malfunction status data 52 based on the received malfunction occurrence information (in a case of new malfunction occurrence information, the malfunction occurrence information is newly registered). Specifically, the control unit 28 sets a value indicating "malfunctioning" as the malfunction status 54 corresponding to a vehicle identification number included in the malfunction occurrence information. The control unit 28 adds a malfunction code included in the malfunction occurrence information to the malfunction log 55.

In Step S3, the control unit 28 transmits the received malfunction occurrence information to the center 1.

In Step S4, the control unit 28 determines whether the malfunction resolution notification is received from the vehicle 3. When the malfunction resolution notification is not received as a result of the determination ("NO" in Step S4), the process returns to Step S1 and is repeated. That is, the process of waiting for the malfunction occurrence information and the malfunction resolution notification is continued.

When the malfunction resolution notification is received ("YES" in Step S4), the control unit 28 updates the malfunction status data 52 based on the malfunction resolution notification in Step S5. Specifically, the control unit 28 sets a value indicating "normal" as the malfunction status 54 corresponding to the vehicle identification number included in the malfunction resolution notification.

In Step S6, the control unit 28 transmits the malfunction resolution notification to the center 1.

The description is ended about the malfunction information management process to be executed by the control unit 28 of the malfunction management server 2.

Processes to be Executed in Center 1

Figure 13:
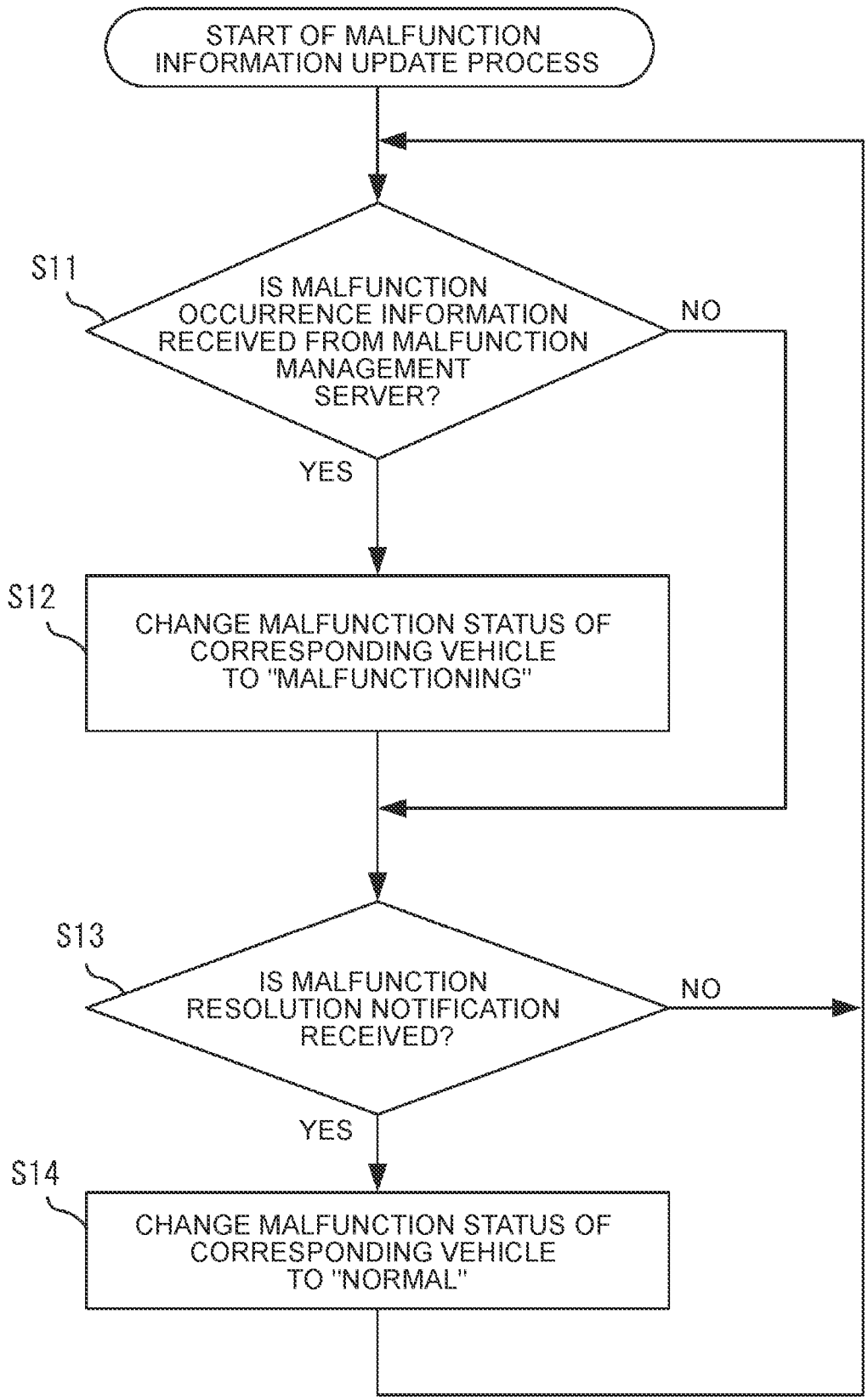
FIG. 13 is a flowchart illustrating details of a malfunction information update process.

Next, details of the processes to be executed in the center 1 will be described. FIG. 13 is a flowchart illustrating details of a malfunction information update process to be executed by the control unit 18 of the center 1. This process is a process for updating the contents of the malfunction status data 62 based on data transmitted from the malfunction management server 2.

In Step S11, the control unit 18 first determines whether the malfunction occurrence information is received from the malfunction management server 2. When the malfunction occurrence information is not received as a result of the determination, the process proceeds to Step S13 described later.

When the malfunction occurrence information is received, the control unit 18 updates, in Step S12, the malfunction status data 62 based on the received malfunction occurrence information (in a case of new malfunction occurrence information, the malfunction occurrence information is newly registered). Specifically, the control unit 18 sets a value indicating "malfunctioning" as the malfunction status 64 corresponding to the vehicle identification number included in the malfunction occurrence information. The control unit 18 adds the malfunction code included in the malfunction occurrence information to the malfunction log 65.

In Step S13, the control unit 18 determines whether the malfunction resolution notification is received from the malfunction management server 2. When the malfunction resolution notification is not received as a result of the determination ("NO" in Step S13), the process returns to Step S11 and is repeated.

When the malfunction resolution notification is received ("YES" in Step S13), the control unit 18 updates the malfunction status data 62 based on the malfunction resolution notification in Step S14. Specifically, the control unit 18 sets a value indicating "normal" as the malfunction status 64 corresponding to the vehicle identification number included in the malfunction resolution notification.

The description is ended about the malfunction information update process.

Figure 14:
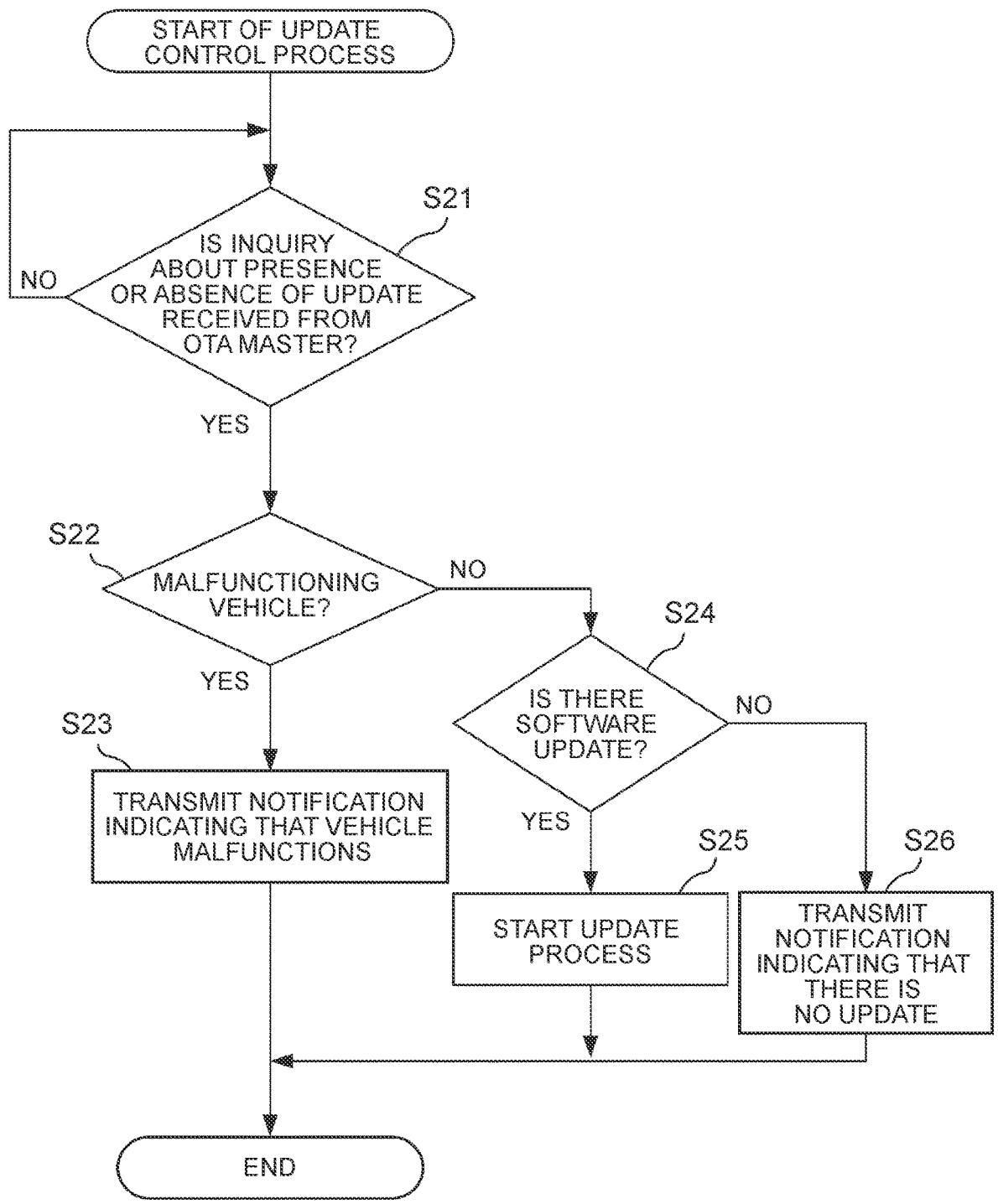
FIG. 14 is a flowchart illustrating details of an update control process.

FIG. 14 is a flowchart illustrating details of an update control process to be executed by the control unit 18 of the center 1. In this process, when an inquiry for software update from the OTA master 31 is received, the control unit 18 determines whether the vehicle 3 related to the OTA master 31 malfunctions. When the vehicle 3 malfunctions, control is executed not to start the update process (even if there is an update).

In Step S21 of FIG. 14, the control unit 18 first determines whether the update inquiry is received from the OTA master 31. When the update inquiry is not received as a result of the determination ("NO" in Step S21), the control unit 18 continues to wait for the update inquiry.

When the update inquiry is received ("YES" in Step S21), the control unit 18 refers to the malfunction status data 62 in Step S22, and determines whether the malfunction status 64 of the vehicle 3 corresponding to a vehicle identification number included in the update inquiry is "malfunctioning".

That is, the control unit 18 determines whether the vehicle 3 that has transmitted the inquiry malfunctions. When the malfunction status 64 is "malfunctioning" as a result of the determination ("YES" in Step S22), the process proceeds to Step S23. In Step S23, the control unit 18 transmits, as an inquiry result, a notification indicating that the vehicle 3 malfunctions (hereinafter referred to as "malfunction notification") to the OTA master 31 that has transmitted the update inquiry. For example, the malfunction notification may include a message that proposes maintenance of the vehicle 3 at a vehicle sales/maintenance company because the vehicle 3 malfunctions. Then, the update control process is terminated.

When the malfunction status 64 is not "malfunctioning" ("NO" in Step S22), the control unit 18 determines in Step S24 whether there is a software update to be distributed. When there is a software update to be distributed as a result of the determination ("YES" in Step S24), the process proceeds to Step S25. In Step S25, the control unit 18 starts the predetermined update process (for example, transmission of update data to the OTA master 31) for applying the software update to the vehicle 3. When the update process is completed, the update control process is terminated. When there is no software update ("NO" in Step S24), the process proceeds to Step S26. In Step S26, the control unit 18 transmits, to the OTA master 31, a notification indicating that there is no software update. Then, the update control process is terminated.

The description is ended about the update control process to be executed by the control unit 18 of the center 1.

Process to be Executed by OTA Master 31

Figure 15:
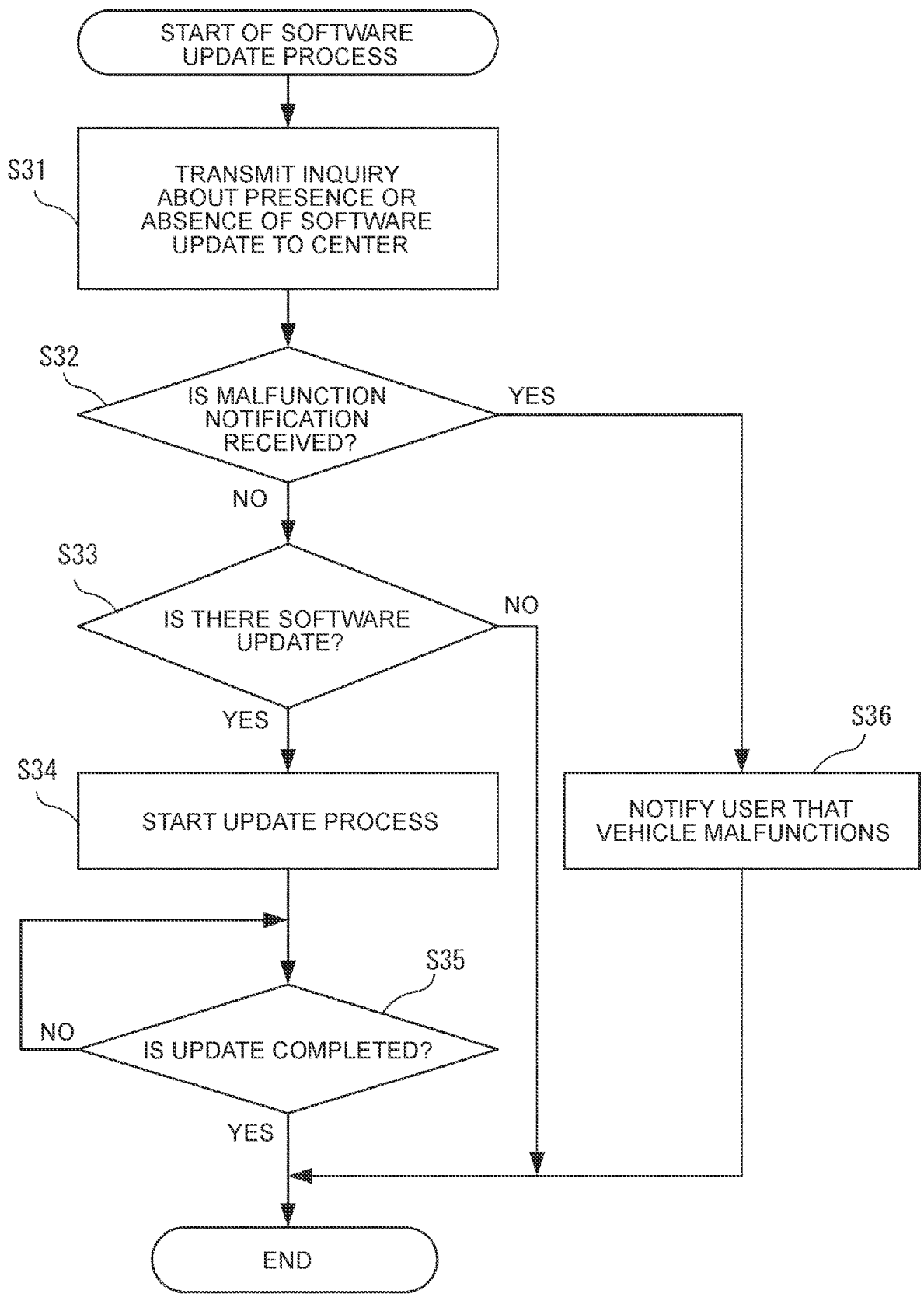
FIG. 15 is a flowchart illustrating details of a software update process.

Next, details of the process to be executed by the OTA master 31 will be described. FIG. 15 is a flowchart illustrating details of the software update process to be executed by the control unit 49 of the OTA master 31. In the present embodiment, the process is periodically executed, for example, once every two weeks as described above.

In Step S31, the control unit 49 first generates data for the update inquiry, and transmits the update inquiry to the center 1. The update inquiry includes a vehicle identification number and vehicle configuration information.

In Step S32, the control unit 49 determines whether the malfunction notification is received from the center 1 as a result of transmitting the update inquiry. When the malfunction notification is received as a result of the determination ("YES" in Step S32), the control unit 49 notifies, in Step S36, a user that the vehicle 3 malfunctions. For example, the control unit 49 causes a predetermined display device (for example, a monitor of a navigation device (not illustrated)) to display a message indicating that the update process cannot be executed because of malfunction in the vehicle 3. In this case, the control unit 49 may execute control to search for a route to the nearest vehicle sales/maintenance company and display the route on the monitor of the navigation device. Then, the control unit 49 terminates the software update process. As a result, it is possible to suppress the execution of software update when the vehicle 3 malfunctions.

When the malfunction notification is not received as a result of the determination in Step S32 ("NO" in Step S32), the control unit 49 determines in Step S33 whether there is a software update as a result of transmitting the update inquiry. When there is a software update as a result of the determination ("YES" in Step S33), the control unit 49 starts the process for updating software in Step S34. Specifically, the control unit 49 starts a process for receiving update data from the center 1 and updating software of the target electronic control device 33.

In Step S35, the control unit 49 determines whether the update process is completed. When the update process is not completed as a result of the determination ("NO" in Step S35), the control unit 49 continues to execute the update process. When the update process is completed ("YES" in Step S35), the control unit 49 terminates the software update process.

When there is no software update as a result of the determination in Step S33 ("NO" in Step S33), the processes in Steps S34 and S35 are not executed, and the control unit 49 terminates the software update process.

The description is ended about the software update process.

Effects

In the present embodiment described above, when the malfunction occurrence information of the vehicle 3 is sent to the malfunction management server 2, the information is transmitted to the center 1. The center 1 stores the information. At a timing when the center 1 receives the inquiry whether the software update is present or absent from OTA master 31, the center 1 determines whether the vehicle 3 malfunctions based on the information stored in the center 1. That is, at this time, the center 1 need not inquire malfunction information from the vehicle 3. When the vehicle 3 malfunctions as a result of the determination, control is executed not to execute the update process to the vehicle 3 that malfunctions, even if there is a software update. As a result, it is possible to prevent the software update from being executed on the malfunctioning vehicle 3 without increasing the amount of communication between the center 1 and the vehicle 3.

Modifications

In the embodiment described above, the center 1 sends, to the malfunctioning vehicle 3, the message or the like indicating its malfunctioning state. In this case, for example, contact information of a vehicle sales/maintenance company nearest to the vehicle 3 or navigation information to a shop of the company may be presented to the user in addition to the message. Thus, the user can easily take action to resolve the malfunctioning state of the vehicle 3.

Although the embodiment of the technology of the present disclosure is described above, the present disclosure can be regarded not only as the center, but also as, for example, an update control method to be executed by a computer of a center including a processor, a memory, and a communication device that can communicate with an OTA master of a vehicle and a predetermined server via a network, a control program for the method, a non-transitory computer-readable recording medium storing the control program, an OTA master that can communicate with the center via the network, a vehicle including the OTA master, and a software update system including a center and a malfunction information management server.

The technology of the present disclosure can be used for a center configured to control a software update function of an OTA master.

What is claimed is:

1. A center configured to communicate with an Over-The-Air (OTA) master and a malfunction management server via a network, the OTA master being mounted on a vehicle, the malfunction management server being configured to store malfunction occurrence information and malfunction resolution information based on information transmitted from the vehicle, the malfunction occurrence information including a malfunction information of the vehicle with a malfunction and identification information for identifying the vehicle with the malfunction, the malfunction resolution information indicating the malfunction occurring in the vehicle has been resolved, the center comprising a processor configured to:

receive the malfunction occurrence information and the malfunction resolution information that are transmitted by the malfunction management server;

in response to receiving the malfunction occurrence information from the malfunction management server, set a vehicle status record to a first status indicating that the vehicle with the identification information included in the received malfunction occurrence information is in a malfunctioning state;

in a case where the vehicle status record is the first status, in response to receiving the malfunction resolution information, change the vehicle status record to a second status indicating that the vehicle is in a normal state;

receive, from the OTA master, an inquiry about presence or absence of an update of software of an electronic control device;

determine, in response to receiving the inquiry, whether the vehicle status record corresponding to the vehicle that has transmitted the inquiry is the first status; and in response to determining that the vehicle status record corresponding to the vehicle that has transmitted the inquiry is the first status, determine whether execution of an update process for the software on the vehicle that has transmitted the inquiry is restricted, and in response to determining that the execution is restricted, transmit a malfunction notification corresponding to the malfunction occurrence information, the malfunction notification notifying a user of predetermined first information related to the malfunction and predetermined second information to resolve the malfunction.

2. The center according to claim 1, wherein the malfunction management server is configured to transmit the malfunction occurrence information to the center when the malfunction occurrence information is newly registered in the malfunction management server.

3. The center according to claim 1, wherein the predetermined second information is contact information of a vehicle sales/maintenance company or navigation information to a shop of the company.

4. An update control method to be executed by a computer of a center including a processor, a memory, and a communication device that is configured to communicate with an Over-The-Air (OTA) master and a malfunction management server via a network, the OTA master being mounted on a vehicle, the malfunction management server being configured to store malfunction occurrence information and malfunction resolution information based on information transmitted from the vehicle, the malfunction occurrence information including a malfunction information of the vehicle with a malfunction and identification information for identifying the vehicle with the malfunction, the malfunction resolution information indicating the malfunction occurring in the vehicle has been resolved, the update control method comprising:

receiving the malfunction occurrence information and the malfunction resolution information that are transmitted by the malfunction management server;

in response to receiving the malfunction occurrence information from the malfunction management server, setting a vehicle status record to a first status indicating that the vehicle with the identification information included in the received malfunction occurrence information is in a malfunctioning state;

in a case where the vehicle status record is the first status, in response to receiving the malfunction resolution information, changing the vehicle status record to a second status indicating that the vehicle is in a normal state;

receiving, from the OTA master, an inquiry about presence or absence of an update of software of an electronic control device;

determining, in response to receiving the inquiry, whether the vehicle status record corresponding to the vehicle that has transmitted the inquiry is the first status; and in response to determining that the vehicle status record corresponding to the vehicle that has transmitted the inquiry is the first status, determine whether execution of an update process for the software on the vehicle that has transmitted the inquiry is restricted, and in response to determining that the execution is restricted, transmitting a malfunction notification corresponding to the malfunction occurrence information, the malfunction notification being used to notify a user of predetermined first information related to the malfunction and predetermined second information to resolve the malfunction.

5. A non-transitory storage medium storing instructions that are executable by a computer of a center including a processor, a memory, and a communication device and that cause the computer to perform functions, the communication device being configured to communicate with an Over-The-Air (OTA) master and a malfunction management server via a network, the OTA master being mounted on a vehicle, the malfunction management server being configured to store malfunction occurrence information and malfunction resolution information based on information transmitted from the vehicle, the malfunction occurrence information including a malfunction information of the vehicle with a malfunction and identification information for identifying the vehicle with the malfunction, the malfunction resolution information indicating the malfunction occurring in the vehicle has been resolved, the functions comprising:

receiving the malfunction occurrence information and the malfunction resolution information that are transmitted by the malfunction management server;

in response to receiving the malfunction occurrence information from the malfunction management server, setting a vehicle status record to a first status indicating that the vehicle with the identification information included in the received malfunction occurrence information is in a malfunctioning state;

in a case where the vehicle status record is the first status, in response to receiving the malfunction resolution information, changing the vehicle status record to a second status indicating that the vehicle is in a normal state;

receiving, from the OTA master, an inquiry about presence or absence of an update of software of an electronic control device;

determining, in response to receiving the inquiry, whether the vehicle status record corresponding to the vehicle that has transmitted the inquiry is the first status; and in response to determining that the vehicle status record corresponding to the vehicle that has transmitted the inquiry is the first status, determining whether execution of an update process for the software on the vehicle that has transmitted the inquiry is restricted, and in response to determining that the execution is restricted, transmitting a malfunction notification corresponding to the malfunction occurrence information, the malfunction notification being used to notify a user of predetermined first information related to the malfunction and predetermined second information to resolve the malfunction.

6. A software update system comprising:

a vehicle including an Over-The-Air (OTA) master;
a malfunction management server; and
a center, wherein:

the vehicle is configured to detect malfunction occurring in the vehicle, and transmit malfunction occurrence information to the malfunction management server, the malfunction occurrence information including information for identifying the vehicle and a malfunction information code related to the malfunction;

the malfunction management server being configured to store malfunction occurrence information and malfunction resolution information based on information transmitted from the vehicle, the malfunction occurrence information including a malfunction information of the vehicle with a malfunction and identification information for identifying the vehicle with the malfunction, the malfunction resolution information indicating the malfunction occurring in the vehicle has been resolved, is the malfunction management server being further configured to communicate with the OTA master and the center via a network, receive the malfunction occurrence information transmitted from the vehicle, and transmit the malfunction occurrence information to the center;

the center is configured to communicate with the OTA master and the malfunction management server via the network, in response to receiving the malfunction occurrence information from the malfunction management server, set a vehicle status record to a first status indicating that the vehicle with the identification information included in the received malfunction occurrence information is in a malfunctioning state;

in a case where the vehicle status record is the first status, in response to receiving the malfunction resolution information, change the vehicle status record to a second status indicating that the vehicle is in a normal state;

receive, from the OTA master, an inquiry about presence or absence of an update of software, determine, in response to receiving the inquiry, whether the vehicle status record corresponding to the vehicle that has transmitted the inquiry is the first status, and in response to determination that the vehicle status record corresponding to the vehicle that has transmitted the inquiry is the first status, determine whether execution of an update process for the software on the vehicle that has transmitted the inquiry is restricted, and in response to determining that the execution is restricted, transmit a malfunction notification corresponding to the malfunction occurrence information, the malfunction notification being used to notify a user of predetermined information related to the malfunction; and the vehicle is configured to notify, in response to receiving the malfunction notification transmitted from the center, a user of predetermined first information related to the malfunction and predetermined second information to resolve the malfunction.

* * * * *